June 13, 1961 O. F. HEVENER 2,987,917
ELECTRICAL INDICATING INSTRUMENT
Filed Jan. 15, 1957
FIG. 1
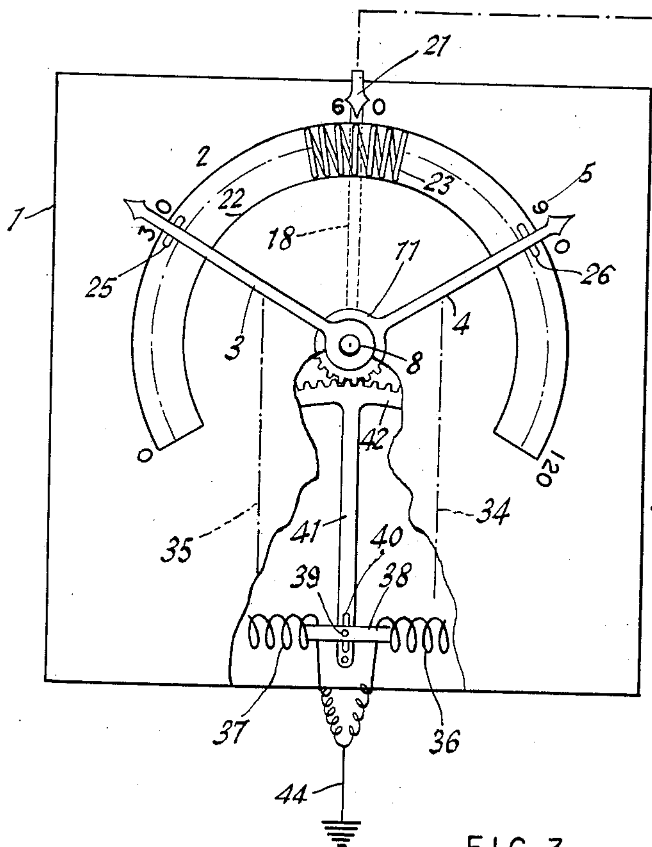
FIG. 2
21 25 24 18 26 22 23 3 4 33 33a 28 12 13 15 10 7 9 31 16 20 32 11 19 8 33 30 13 14 17 35 34 1 29 6 42
17 18 16 29 42
FIG. 1A
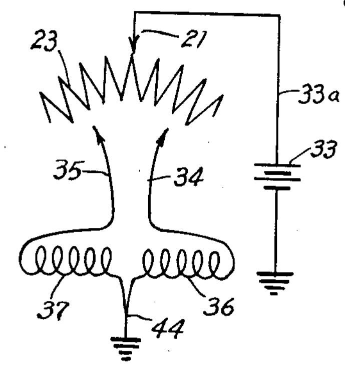
FIG. 3
27
FIG. 4
41
41
43
INVENTOR.
Osborn Fort Hevener
BY
William F. Nickel
ATTORNEY United States Patent Office 2,987,917

Patented June 13, 1961

2,987,917

ELECTRICAL INDICATING INSTRUMENT

Osborn Fort Hevener, Essex Road, Essex Fells, N.J.

Filed Jan. 15, 1957, Ser. No. 634,387

1 Claim. (Cl. 73—336)

My invention is an improved instrument for indicating atmospheric conditions in connection with prevailing weather; especially temperature and humidity, and the effect of the latter in regard to the actual temperature as shown by the thermometers of the conventional type.

An important object of the invention is to provide an indicator, which can be electrically controlled and which is simple in construction and certain and efficient in operation; having a single scale and movable members showing temperature and humidity, and the resultant of these two factors; by means of a pointer or additional index member which always assumes the correct position for all changes, large or small, in temperature or humidity or both when these main factors vary in any manner together.

In the specification of my Patent 2,874,571, I have disclosed an instrument for the same purpose having one scale only with suitable graduations and three index members that are independently movable and mechanically united to cooperate with the characters on the face of the scale and give the readings desired. One of the members reveals the arithmetical mean of the numbers on the scale to which the humidity and temperature members point, and this is the principal reading which it is my object to present. With this invention the scale is the same, but the three index members are interconnected with electrical means for actuating them in the fashion required to attain the same object, The design of the instrument is clearly described in the following specification and the novel features are pointed out in the claim. But the drawings illustrate only the best form of the invention now known to me and I may make changes in details without material deviation from the general plan or combination in which the invention resides.

On the drawings:

FIGURE 1 is a view, somewhat diagrammatic of the instrument according to my invention.

FIGURE 1*a* is a diagram of the electrical circuit.

FIGURE 2 is a vertical section showing how the index members are mounted and connected in an electrical circuit, and FIGURES 3 and 4 are views of details.

The instrument is shown as comprising a dial plate 1, and on the surface of this plate is a single scale 2 having graduations disposed in a long circular arc on its face. Cooperating with the scale 2 are the movable index members 3 and 4, which are like the hands of a clock, and are mounted to revolve about a common axis at the center of the fixed plate 1 and scale 2, and thus move along the scale in either direction. The index member 3, for example, points to a number giving the degree of temperature; and the other pointer 4 shows on the same scale percentage of humidity. The instrument may have any suitable shape with all parts enclosed in a housing, and the scale and movable members in plain view at the front thereof.

The graduations 5 of the scale run from zero to one hundred and over, and the numbers associated with the graduations begin with the zero mark, and are 10 or some other number or multiples thereof. Hence the same numbers can give readings for both the temperature and percentage of moisture in the air, according to the positions of the members of hands 3 and 4. The latter are made so that the position of each is apparent at a mere glance. Each may have a distinctive form and color, such as red for temperature, and for humidity green or white, or bear the appropriate names. The scale may include graduations below zero if desired.

To mount the hands 3 and 4, both of which are of metal, the instrument has within it a fixed member with a bearing opening, and the temperature pointer 3 has a metal hub 7 affixed to a metal shaft 8 rotatably supported in the bearing 6. A heat responsive coil 9 has one end affixed to the shaft 8, and the other is anchored to a fixed pin 10 on the back of the member 6. The bushing 6 is made of insulating material, and is behind the dial plate 1, the member 3 and hub 7 being at the front of the plate bearing the scale 2.

The hand 4 also has a metallic hub 11 affixed to short tubular shaft or arbor 12 of insulation enveloping the shaft 8, the rear end of the shaft 12 projecting back out of the rear face of the plate 1 but terminating short of the bearing member 6. At its inner end behind the plate 1 the shaft 12 has a collar or flange 13, that abuts the dial plate. This flange is secured in any suitable fashion to one extremity of a coil 14 made of a material affected by moisture, and having its opposite extremity anchored to the plate 1 by means of a pin or stud or other stationary element 15 thereon. A similar pin secures one end of the coil 9 to the shaft 8. The hands 3 and 4 have their hubs or bosses 7 and 11 made fast to the arbors 8 and 12 respectively. The casing for the movable members is omitted from the drawing for the sake of convenience and clearness.

Thus the hand 3 always points to the degree of temperature and the hand 4 shows the percentage of humidity by means of the same numbers on the scale 2. The simplicity and advantage of the combination are thus fully established.

Loosely mounted on the shaft 8 between the tubular shaft or sleeve 12 and the member 6 is a ring 16 of insulation enveloped by a metal ring 17, which serves as a hub for another index member 18 affixed to this metallic ring 17.

On the shaft 8, at the opposite side of the member 6 is a fixed washer or collar 19, and the shaft 8 is held against longitudinal movement by this collar at one end and the hub 7 of the member 3 at the other. The pin fixing the coil 9 to the inner end of the shaft 8 is indicated at 20. The index member 18 projects forward over the top of the dial plate and has its end 21 turned down so that it can mark a point of reading on the scale 2. The ring 17 bears teeth on part of its outer surface but most of its surface between the teeth and the bearing member 6 is smooth.

The plate 1 has a circular slot 22 therein topped by the scale 2 and this slot 22 serves as a seat for a metallic coil 23. The index member 18 behind the dial plate carries a brush 24 which engages the adjacent portions of this coil and the index member 3 has a brush 25 which engages the coil 23 in front of the plate 1. Likewise the index member 4, which is somewhat shorter than the member 3, has a brush 26 which engages the coils 23 in front of the dial 1, and the brushes 25 and 26 are so disposed and connected to the respective members 3 and 4, that these members can swing past each other as either may be actuated by the coil 9 or 14. Each of the brushes 24, 25 and 26 has an end in contact with the coil 23 and is shaped to form a transverse curved shoe 27 so that these brushes can always be in rubbing contact with the coil 23 at one point and pass from one turn to the other very easily.

The smooth part of the metal ring 17 adjacent the member 6 is engaged by a contact brush 28 fixed to the member 6. This smooth portion, as above stated, is between the part with teeth 29, which is in contact with the flange 13 of the sleeve 12, and the member 6. A similar brush 30 engages the hub 11 of the member 4, and a third brush 31 makes contact with the end of the shaft 8 adjacent the member 3. These brushes 30 and 31 are supported in fixed position in any feasible way. The brush 28 is connected by a wire 33*a* to a battery 33. The brushes 30 and 31 are connected each by a lead wire 34 and 35 respectively to one terminal of magnetic coils 36 and 37 respectively, arranged horizontally in line with each other and having a bar armature 38 of soft iron between them. The coils 36 and 37 are attached to a fixed member such as the plate 1. This armature has a pin 39 at its midpoint which engages a longitudinal slot 40 in an upright lever 41 bearing on its opposite ends a gear segment 42 which meshes with the teeth 29 on the ring 17. The lever 41 is mounted on a pivot 43 at its lower end attached for example to the plate 1. The opposite end of the two coils 36 and 37 is connected by a wire 44 to the opposite pole of the battery 33 via ground connections at the wire and battery respectively. The hubs 7 and 11 are secured to the shafts 8 and 12 respectively by pins 32 and 33.

The manifold helical turns of the coil 23 are all of equal resistance and so are the members 3 and 4 which with the member 18, are of course set so as to keep the brushes thereon in constant engagement with this coil. The resistance of the leads 34 and 35 and the coils 36 and 37 are equal and these coils are so wound that the magnetic force of each is equal and will exert a pull or attraction in opposite directions on the armature 38. The coils each enclose a space for the armature to enter and this armature may have its ends projecting into these spaces or be otherwise supported in line therewith.

In operation current from the battery 33 passes by way of the lead 33*a*, brush 28 and ring 17 to the member 18 and brush 24 to the coil 23 and divides so as to flow through portions of the coil 23 at each side of the brush 24 to both brushes 25 and 26 and the members 3 and 4 to the brushes 30 and 31. As long as member 18 is in mid-position relative to the two members 3 and 4 the current flowing through the two portions of the coil 23 to each member 3 and 4 will be equal. Therefore the current in the leads 34 and 35 and the magnetic coils 36 and 37 will be of equal strength, and the magnetic coils will exert the same pull on the armature 38 and have no effect in moving the rocker or lever 41. Hence the member 18 will remain in mid-position. If however, the temperature should increase so as to cause the member 3 to swing clockwise, more current will now flow to the brush 25 because the portion of the coil between the brushes 24 and 25 is shortened and its resistance is reduced. The member 3 and the brush 31 and the magnetic coil 37 connected to the brush 31 now have a larger current and the coil or solenoid 37 will exert a stronger pull and draw the armature 38 to the left. Hence the rocker 41 will swing counter clockwise and segment 42, in mesh with the teeth 29 on the ring 17 will swing the member 18 to the right until it reaches a point where the number of turns on the coil 23 is again equal between the member 18 and each member 3 and 4. The pull of the magnetic coils 36 and 37 is now balanced and the member 18 once more assumes position midway between the members 3 and 4 and gives the correct reading, which is the mean of the two readings given by the members 3 and 4 combined.

Should the member 3 swing to the left more current would flow through the brush 26 and member 4 the brush 30 and lead 34, and the coil 36 at the right will exert a stronger attraction on the armature 38, with the result that the rocker 41 will turn the member 18 to the left till it again reaches midway position between the members 3 and 4, and the pull of the two coils 36 and 37 becomes equal. If the member 4 moves in either direction the member 18 will again take mid-position and thus the member 18 always gives the reading desired. This reading I call "humiture," signifying that it is a combination of the temperature and humidity arrived at by taking the arithmetical mean of the numbers on the scale 2 adjacent the members 3 and 4.

This specification discloses only the principal parts of the instrument and the arrangements thereof, together with the connections for producing the required mode of operation. Various changes in the arrangement of parts and the design of the casing not shown as now disclosed may of course be adopted in practice without departure or alteration of the principle which is here set forth.

The member 18 is always connected at some point with the resistance coil 23 and the portions between this point and the brushes 25 and 26 on two other members constitute resistance elements in parallel. Each of these elements is in series with one of the members 3 and 4 and one of the coils 36 and 37, and the circuit thus includes portions in parallel with each other. Each of said portions include part of the coil 23, one of the indicator members and one of the magnet coils. Each of the said magnet coils has a terminal joined to an indicator member 3 or 4 and its opposite terminal connected to the proper pole of the battery 33. Of course the resistance of the members 3 and 4 and of the leads 34 and 35 must likewise be equal.

The rocker lever 41 has a much greater radius between its pivot 43 and the segment 42 than the radius of the ring 17 with the gear teeth 29 thereon. Hence a small movement of this lever can produce a greater movement of the member 18, and the instrument is thus very sensitive in action.

Having described my invention what I claim is:

An electrical instrument comprised of a dial plate having on its face a scale bearing characters signifying both temperature and humidity, a pair of indicating members adjacent to said plate movable across the dial, a temperature responsive coil connected to one of said members, a coil responsive to moisture in the air and connected to the other member, a third member mounted adjacent to said dial plate, all said members mounted to rotate around a common axis, a resistance element carried by said plate, a source of electric energy connected to the third member, all said members engaging said resistance, portions of said resistance and said first-named members being in parallel, a magnet coil connected to each of the first-named members and to the said source, said magnet coils being in alignment, a common armature between said coils, a rocker lever connected to said armature and to the third member and operated by the armature to hold the third member in position between the other two.

References Cited in the file of this patent

UNITED STATES PATENTS

| | | |
|---|---|---|
| 800,654 | Kitsee | Oct. 3, 1905 |
| 1,061,192 | Leonard | May 6, 1913 |
| 1,446,437 | Barili | Feb. 20, 1923 |
| 1,460,128 | Hill | June 26, 1923 |
| 1,493,586 | Wood | May 13, 1924 |
| 1,494,586 | Cary | May 20, 1924 |
| 1,638,103 | Roucka | Aug. 9, 1927 |
| 1,834,987 | Van Eyk et al. | Dec. 8, 1931 |
| 1,866,721 | Pease | July 12, 1932 |
| 1,956,386 | Gruss | Apr. 24, 1934 |
| 2,086,258 | Crosthwait | July 6, 1937 |
| 2,194,041 | Woodling | Mar. 19, 1940 |

FOREIGN PATENTS

| | | |
|---|---|---|
| 638,902 | Germany | Nov. 25, 1936 |